United States Patent
Nakamura

(10) Patent No.: US 8,179,567 B2
(45) Date of Patent: May 15, 2012

(54) COLOR CONVERSION APPARATUS AND COLOR CONVERSION METHOD

(75) Inventor: Takashi Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 12/164,887

(22) Filed: Jun. 30, 2008

(65) Prior Publication Data

US 2009/0009833 A1 Jan. 8, 2009

(30) Foreign Application Priority Data

Jul. 5, 2007 (JP) ................................. 2007-177246

(51) Int. Cl.
*G06F 15/00* (2006.01)
*G03F 3/08* (2006.01)
*H04N 1/40* (2006.01)

(52) U.S. Cl. ......... 358/1.9; 358/518; 358/504; 358/3.23

(58) Field of Classification Search .................... 358/1.9, 358/518, 504, 3.23, 525
See application file for complete search history.

(56) References Cited

U.S. PATENT DOCUMENTS

| | | | |
|---|---|---|---|
| 6,778,185 B1 * | 8/2004 | Moroney | 345/590 |
| 7,499,202 B2 * | 3/2009 | Ono | 358/518 |
| 7,936,919 B2 * | 5/2011 | Kameyama | 382/167 |
| 2007/0081178 A1 * | 4/2007 | Kim et al. | 358/1.9 |
| 2009/0040573 A1 * | 2/2009 | Lee | 358/505 |

FOREIGN PATENT DOCUMENTS

| | | |
|---|---|---|
| JP | 06-225130 | 8/1994 |
| JP | 10-070665 | 3/1998 |
| JP | 2005-130274 | 5/2005 |

OTHER PUBLICATIONS

Office Action dated Oct. 21, 2011 in corresponding Japanese Application No. 2007-177246.

* cited by examiner

*Primary Examiner* — Houshang Safaipour

(74) *Attorney, Agent, or Firm* — Fitzpatrick, Cella, Harper & Scinto

(57) ABSTRACT

An object of the present invention is to display a color by sufficiently utilizing a color space capable of being displayed by a display. In order to attain the above described object, a color conversion apparatus according to the present invention includes unit that reads an original in which a whole reproducible color gamut is discretely expressed, and acquires color coordinates of a first color space, and color conversion unit that converts the acquired color coordinates of the first color space into a second color space, wherein the color conversion unit converts the color coordinates in the first color space to be substantially the same as color coordinates in the second color space.

8 Claims, 7 Drawing Sheets

COLOR CONVERSION APPARATUS AND COLOR CONVERSION METHOD

BACKGROUND OF THE INVENTION

1. Field of the Invention

The present invention relates to a color conversion apparatus and a color conversion method, and more particularly to a color conversion apparatus and a color conversion method for image information read by using a scanner.

2. Description of the Related Art

As the processing function of an image input device, color reproduction suitable for display on the display is performed by correcting the RGB signal (hereinafter, called "dRGB") of a device which is read (refer to Japanese Patent Laid-Open No. 10-070665 (1998)). More specifically, the processing of identifying the color of an original by in advance measuring the spectral reflectance of the original to be read, determining normalized RGB signal values for reproducing a color with a small color difference from the identified color on the display, and converting the dRGB into the normalized RGB signals is performed. Here, the normalized RGB refers to, for example, sRGB, AdobeRGB (Hereinafter, referred to as "aRGB". Here, Adobe is a registered trademark.) and the like. The color difference means the difference in color expressed by using a distance $\Delta E$ or the like in a CIE-L*a*b* space, for example. By thus performing color conversion, the color of an original and the color displayed on a display by reading the original are made substantially the same.

Incidentally, on the occasion of printing the image which is imaged by an image pick up device such as a digital still camera as a hard copy, color gamut compression occurs no matter what printer is used to print it. This is because the reproduction space of imaged electronic data is displayed on a display by additive color mixture, but the color space in which the printed image is reproduced is reproduced by subtractive color mixture, and therefore, color gamuts which do not match with each other theoretically occur. Therefore, the printed image is generally displayed in the color gamut differing from that of the case of being displayed in an arbitrary RGB color space such as sRGB and aRGB on a display. When an image is displayed in different color gamuts in this way, color gamut compression is performed so that the respective views become close to each other. Japanese Patent Laid-Open No. 6-225130 (1994) discloses an example of such a technique. However, the image obtained by reading an image subjected to color gamut compression is intended for having a small color difference from the image subjected to color gamut compression, and therefore, when the original read by using a scanner is displayed on a display, the image cannot be decompressed to be the image before subjected to the color gamut compression. Further, when a film photo is scanned as an original, conformity with the original is considered to be of primary importance, and colors realized by making full use of the color space which can be originally displayed by the display cannot be displayed.

SUMMARY OF THE INVENTION

In order to solve the above described problem, a color conversion apparatus according to the present invention includes unit that reads an original in which an entire reproducible color gamut is discretely expressed, and acquiring color coordinates of a first color space, and color conversion unit that converts the acquired color coordinates of the first color space into a second color space, wherein the color conversion unit converts the color coordinates of a maximum color reproduction range in the first color space to become color coordinates of a maximum color reproduction range in the second color space.

As described above, according to the present invention, when an image of an original is output on an image output device such as a display, for example, color reproduction effectively utilizing the maximum color reproduction range of the image output device can be realized irrespective of the color gamut of the image of the original. Further, color reproduction of the images of various originals effectively utilizing the maximum color reproduction range of the image output device can be realized irrespective of the kinds of the originals.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DESCRIPTION OF THE EMBODIMENTS

Hereinafter, embodiments of the present invention will be described with reference to the drawings.

Embodiment 1

Figure 1:
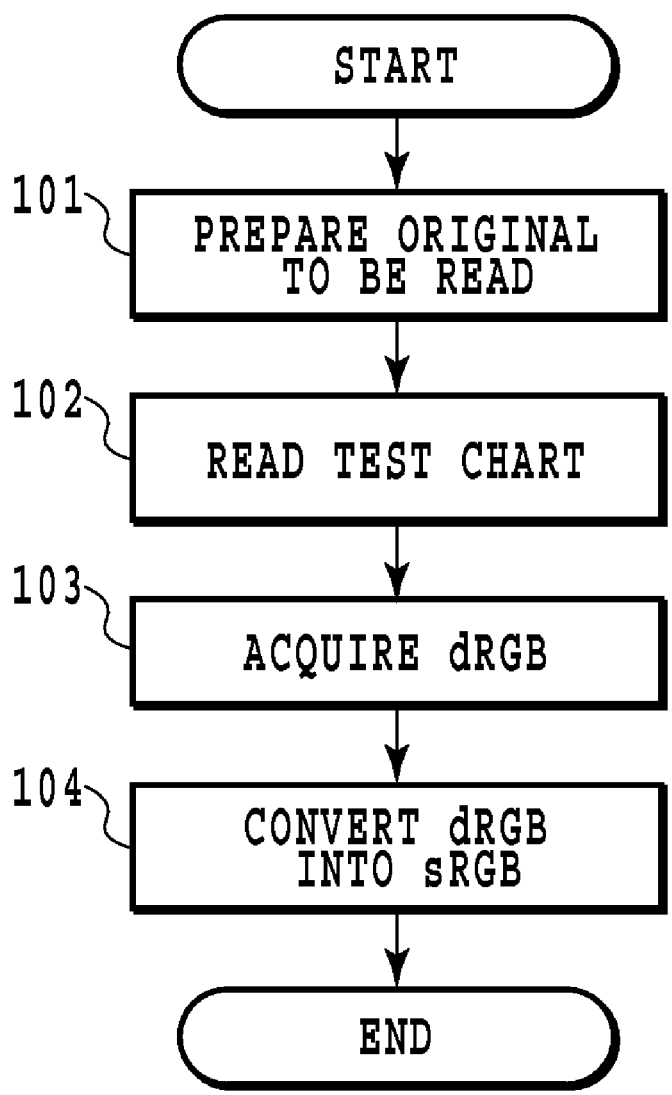
FIG. 1 is a flowchart showing a process of the present invention.
Figure 2:
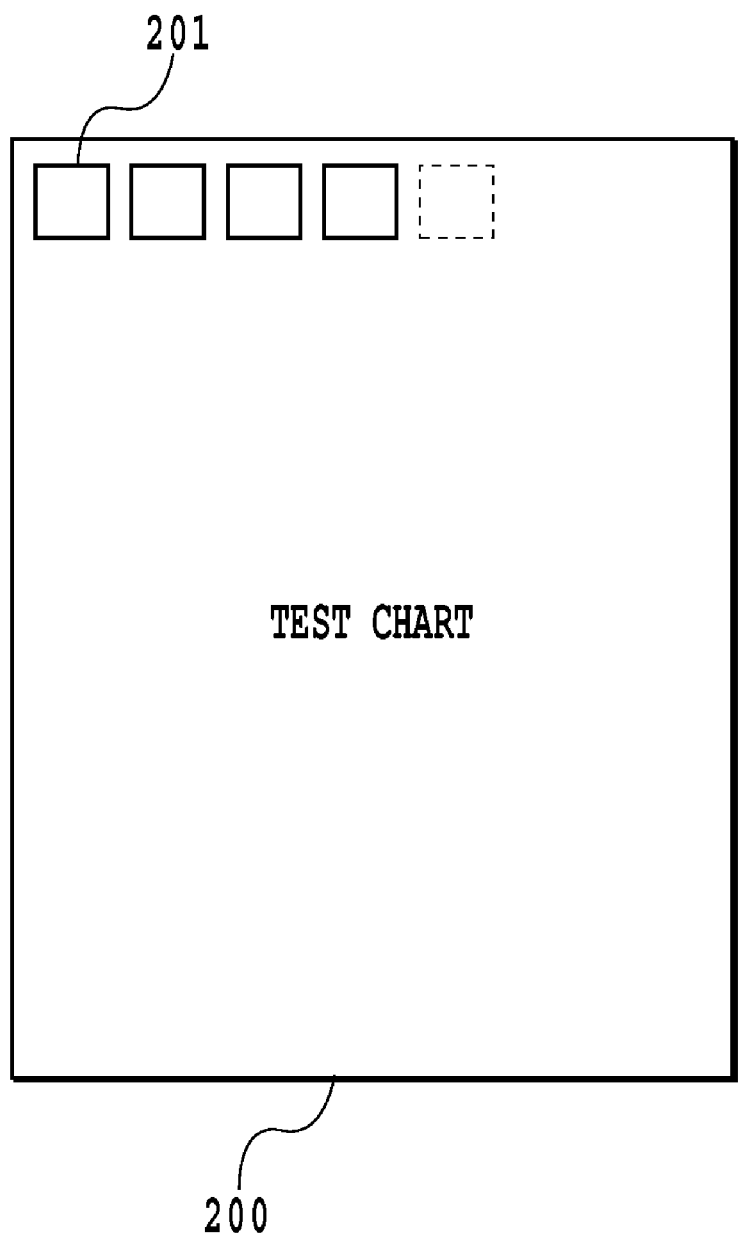
FIG. 2 is an example of a test chart used in the present invention.

Embodiment 1 according to the present invention will be described. The present invention is carried out as shown in FIG. 1. An original prepared in step 101 is a test chart 200 with the color gamut of the original specified as shown in FIG. 2. In the test chart 200, each channel of an eight bits sRGB signal value of, for example, is divided at proper intervals from zero to 255, and there are color patches 201 which correspond to the sRGB signal values given by the division of each channel. And in the test chart 200, the sRGB signal values given by above process that is printed by a printer such as an ink-jet printer of which the entire color gamut that is reproducible by the printer when the sRGB signal value is printed, is discretely expressed.

The color patches represented by the color patches 201 shown in FIG. 2 indicate a printing of signal values of (R, G, B) (sRGB signal values) on a display. These signal values are used as color coordinates in a color space.

After the process of step 101 shown in FIG. 1 is finished, the process goes to step 102 next. In step 102, the test chart prepared in step 101 is read. Here, for example, a flat bed scanner is used for reading the test chart.

Hereinafter, the flat bed scanner will be described with reference to FIG. 3. The flat bed scanner is composed of a scanner unit 302 which reads an original and acquires color coordinates of the original, a motor 301 which drives the scanner unit, an I/F 303 which is an interface for transferring a signal read from a reader 300 to an outside, and the like.

Figure 4:
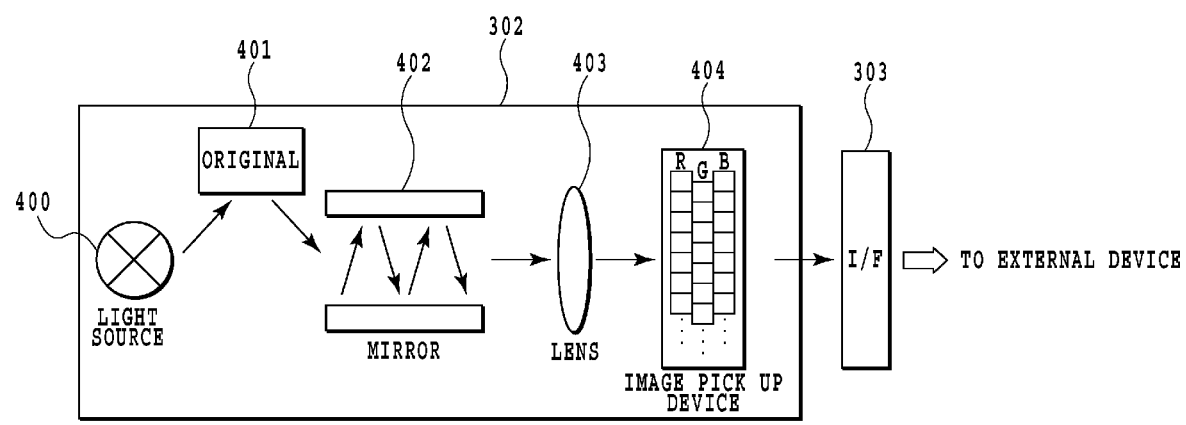
FIG. 4 is a schematic diagram of a scanner unit.

Here, the scanner unit 302 will be described in detail with reference to FIG. 4. The scanner unit 302 includes a light source 400. The light source 400 irradiates an original 401 sandwiched by a transparent original platen (not illustrated) and a pressure plate (not illustrated) which retains the original. The reflected wave from the original 401 repeats reflection at a mirror 402, and passes through a lens 403 to form an image on an image pick up device 404. The image pick up device includes filters of R, G and B, decomposes the reflected wave passing through the lens 403 into three colors of R, G and B, and obtains electric signals by photoelectric conversion. The electric signals are called dRGB signals here since they are RGB of the device.

After step 102 shown in FIG. 1 is finished, the dRGB signals obtained in step 102 are next subjected to color conversion by a color conversion processing section 311 in step 103.

A detailed example of the color conversion will be described hereinafter. As the method disclosed in, for example, Japanese Patent Laid-Open No. 2005-110089, the color conversion can be realized by generating/converting a color conversion matrix by performing association by using a pseudo inverse matrix for the combination of the dRGB signal value obtained for each color patch and the calorimetric value of the color patch. The calorimetric values given at this time are not the calorimetric values of the test chart prepared in step 101, but the calorimetric values on the display of the color patches before the test chart is printed, that is, the values of CIE-L*a*b* defined by sRGB. As a result, the color conversion matrix for converting the color coordinates showing the maximum color reproduction range in dRGB into the color coordinates in the vicinity of the maximum color reproduction range of sRGB can be created.

It should be noted that the color conversion matrix becomes the matrix formed of matrix coefficients which are made by optimizing not only the signal values of the color patches in the maximum color reproduction ranges in dRGB and sRGB but also the signal values of the color patches outside the maximum color reproduction ranges in dRGB and sRGB. Accordingly, when the color coordinates representing the maximum color reproduction range of dRGB are converted by using the color conversion matrix, the color coordinates are not converted into the maximum color reproduction range of sRGB, but are converted into the vicinity of the maximum reproduction range of sRGB. In the color conversion of the present embodiment, the case of those converted into the maximum color reproduction range of sRGB itself as well as the case of those converted into the vicinity of or substantially the same as the maximum color reproduction range of sRGB are defined as the case where the color coordinates representing the maximum color reproduction range of dRGB are converted into the color coordinate values in the maximum color reproduction range of sRGB.

When step 103 shown in FIG. 1 is finished, the process goes to step 104 next. In step 104, each of the dRGB signal values of the test chart is converted into sRGB signal by using the color conversion matrix generated as described above. Then, all the printed color reproduction region is converted substantially similarly to all the color reproduction region in CIE-L*a*b* of sRGB. Further, the relative color coordinates between arbitrary color coordinates in the color reproduction range in the color space before color conversion are stored in the reproducible color gamut in the color space after color conversion. It should be noted that the storage does not mean total storage, but means substantial storage by using the color conversion matrix.

Figure 3:
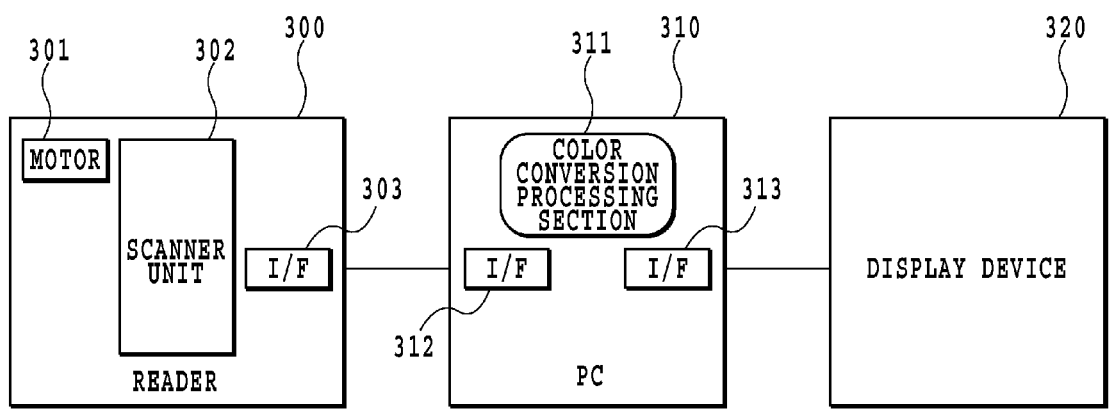
FIG. 3 is a schematic diagram of a flat bed scanner.

The dRGB signal converted in the color conversion processing section 311 thus created is transferred to a display device 320 in FIG. 3 and is displayed as the sRGB signal.

By using the method described above, the entire color gamut of the original can be expressed by using the entire gamut of the display. It should be noted that in the above described embodiment, the explanation is made by using the output matter by the ink-jet printer as the printed original to be read, but the printer which prints the original is not limited to this. A laser printer, a developing printer for a film, and an original of offset printing may be adopted. What is necessary is the maximum color gamut of the original in accordance with the printer, and it is important to convert this into an electric signal by photoelectric conversion and further convert it into sRGB as described above.

Further, in the above described embodiment, the explanation is made with sRGB taken as an example as the conversion destination of dRGB, but the conversion destination is not limited to sRGB. For example, aRGB or another normalized RGB space may be adopted. What is necessary and important is the color conversion into the color space in which the RGB signal and the normalized color space such as CIE-L*a*b* that is display color are associated beforehand as the display device.

Furthermore, in the above described embodiment, as the method for color conversion, explanation is made by using the method disclosed in Japanese Patent Laid-Open No. 2005-110089, but in carrying out the color conversion method, the method is not limited to this. Specifically, the optimization mapping method using, for example, a least-squares method may be adopted. This is because what is necessary is not the method for color conversion, but what is important is the RGB space in which the colors of the conversion destination of dRGB are specified beforehand.

It goes without saying that the mounting method of the above described color conversion method may be carried out by hardware or software. Specifically, it may be mounted as a signal processing circuit of a stand-alone copying machine. Alternatively, the mounting method of the above described color conversion method may be such that the conversion method may be installed in a PC (personal computer) 310 connected to the reader 300 and the display device 320 with the I/Fs 312 and 313 shown in FIG. 3 as an executable program. In this case, the I/F 303 is connected to the I/F 312, and the I/F 313 is connected to the display device 320.

Furthermore, it goes without saying that a plurality of kinds of the above described color conversion methods can be mounted. Specifically, a plurality of color conversion processing sections may be held in accordance with the kinds of the originals, such as a color conversion processing section optimal for an output original of an ink-jet printer, and a color conversion processing section which is optimal when a film photo is used as an original.

Furthermore, the color conversion unit which realizes color conversion for the photographic paper output matters of the ink-jet printers of, for example, a plurality of manufacturers, and film photo print can be shared. This is because on this occasion, there is the possibility of color reproduction accuracy being slightly sacrificed, but the respective printed matters are substantially equal, and therefore, substantially equal images can be obtained.

Furthermore, the flat bed scanner using a reduction optical system is described as an example in the present embodiment, but the reader is not limited to this. Specifically, a contact image sensor type or a non-contact type reader may be adopted. What is necessary is that the original can be read in the device-dependent color space of three colors of R, G and B.

Embodiment 2

Another mode of carrying out the present invention will be described. A recording device generally associates dRGB signals that are color signals dependent on the device with the color space independent from the device. As a concrete example of such association, an ICC profile is cited. Hereinafter, a CIE-L*a*b* space as a Profile Connection Space (hereinafter, called "PCS") color space which is independent from the device, and the ICC profile as describing association of dRGB and the CIE-L*a*b* space will be described as examples.

Figure 5:
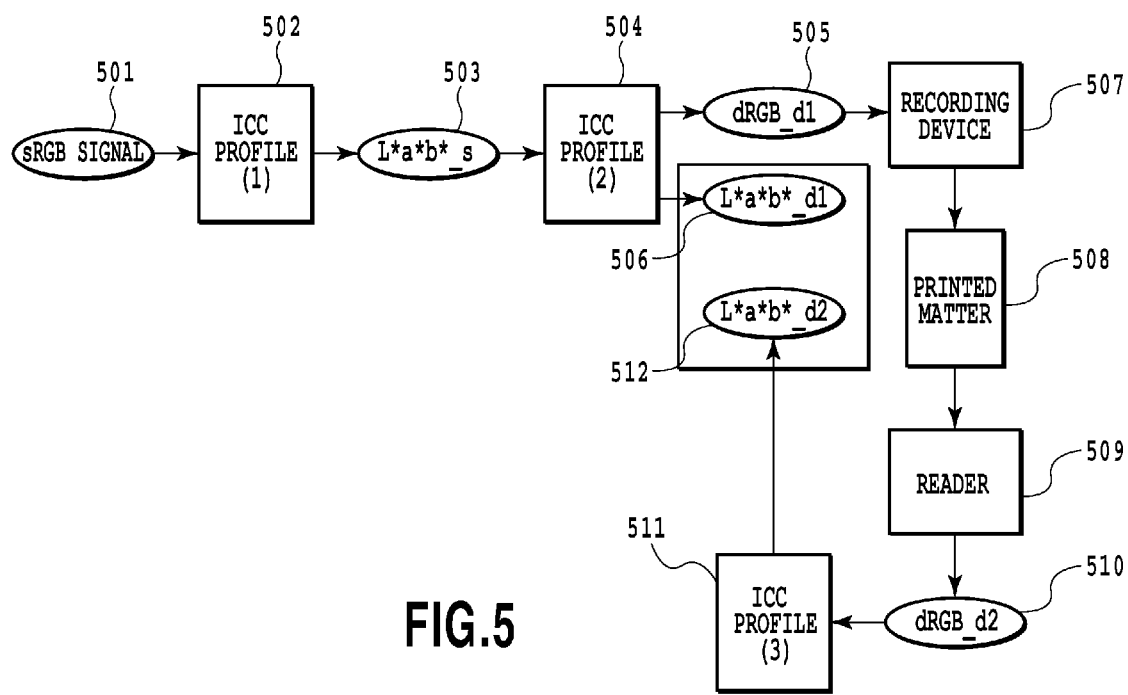
FIG. 5 is a schematic diagram of color conversion processing using a PCS space and ICC profiles.

FIG. 5 is a block diagram of the process up to printing the electronic data by using the ICC profile, and the relationship between an image reader for reading the printed matter and the ICC profile. An sRGB signal 501 is electronic data stored in sRGB. The sRGB signal 501 is converted with an ICC profile (1) 502 to be an L*a*b*_s 503 which is a device-independent color space. The L*a*b*_s 503 is converted with an ICC profile (2) 504 as being associated with the dRGB space dependent on a recording device 507 to obtain a dRGB_d1 (505) specialized for the recording device 507. On this occasion, an L*a*b*_d1 (506) as an estimated value is also obtained. By recording the dRGB_d1 (505) with the recording device 507, a printed matter 508 is obtained. In the printed matter 508, a whole color gamut which is reproduced by printing the sRGB is discretely expressed in the same way as the test chart 200 of FIG. 2. By reading the printed matter 508 as a read original with a reader 509, a dRGB_d2 (510) that is device-dependent RGB specialized for the reader 509 is obtained. Conventionally, the dRGB_d2 (510) is associated with the L*a*b* space that is a device-independent color space. Specifically, the ICC profile (3) 511 is set so that an L*a*b*_d2 (512) that is the result of conversion with the ICC profile (3) 511 and the L*a*b*_d1 are substantially the same. In the present embodiment of the present invention, an ICC profile (4) 513 which creates an L*a*b*_d2' (514) in which the dRGB_d2 obtained by the reader 509 as shown in FIG. 6 becomes substantially the same as the L*a*b*_s 503 is created.

Hereinafter, concrete unit that creates the ICC profile (4) 513 will be described. FIG. 7 is a block diagram for creating the ICC profile (4) 513. The ICC profile (1) 502 shown in FIGS. 5 and 6 has a lookup table (hereinafter, called "LUT") 601. The LUT 601 is shown in FIG. 7. Specifically, when an arbitrary sRGB signal is input therein, the LUT 601 is a LUT which outputs the corresponding L*a*b*value. Specifically, its essence is L*a*b*=L*a*b*_s itself corresponding to the arbitrary sRGB signal value.

Figure 6:
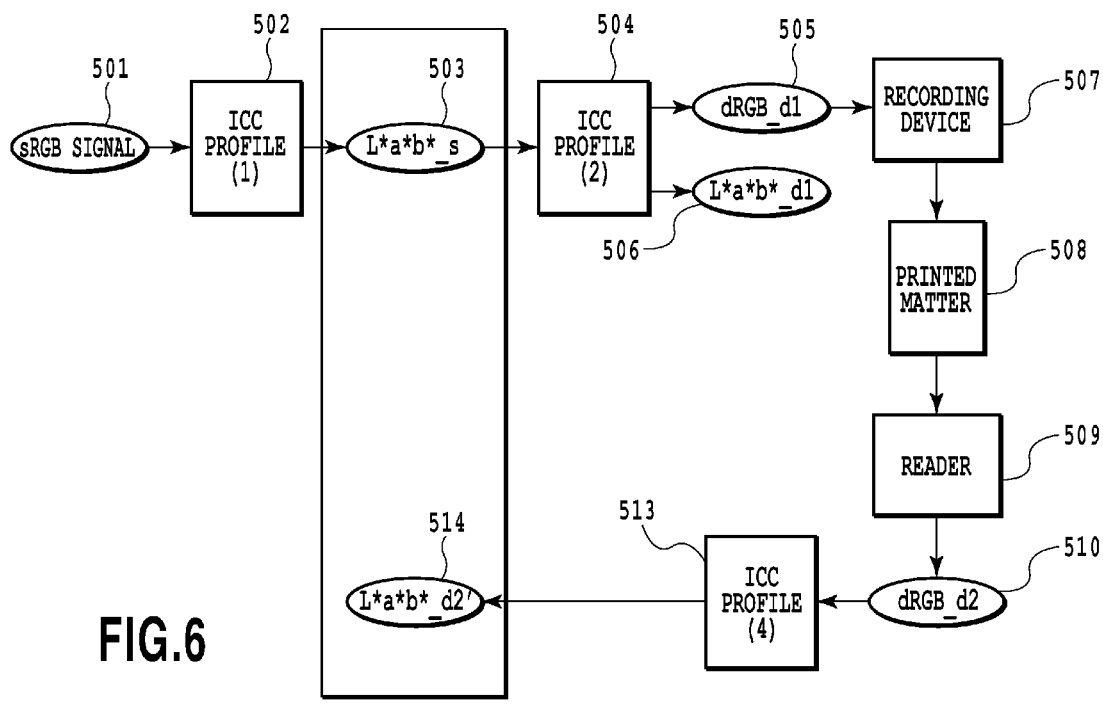
FIG. 6 is a schematic diagram of color conversion processing using a PCS space and ICC profiles.
Figure 7:
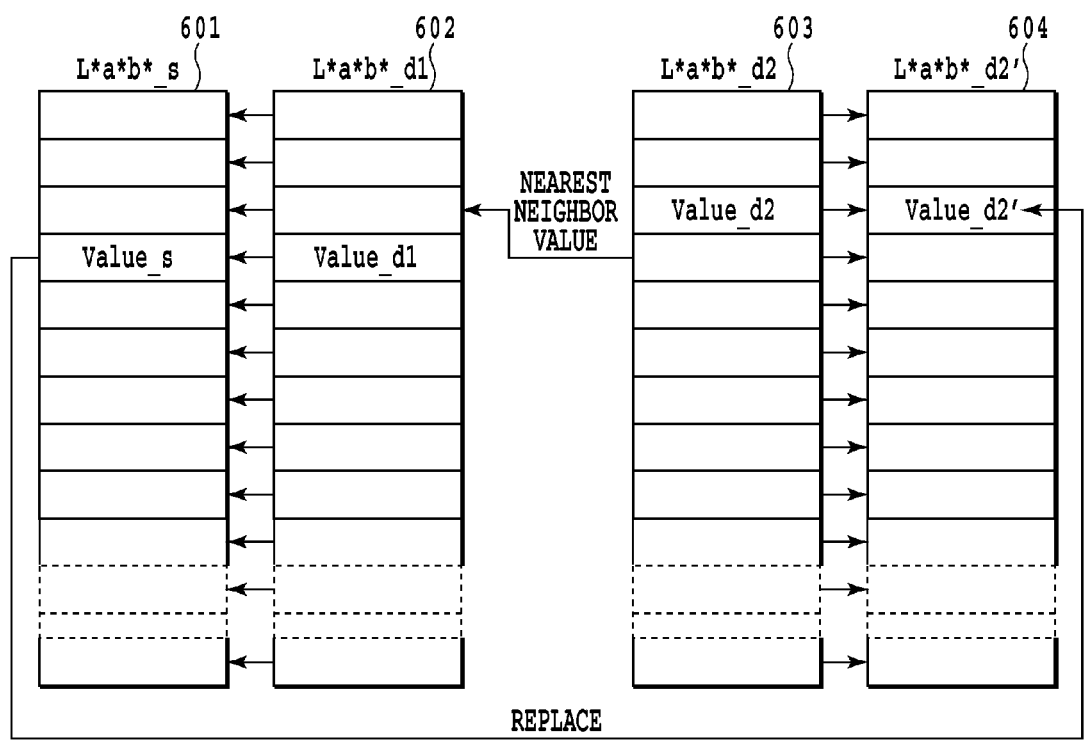
FIG. 7 is a diagram explaining an example of generating an ICC profile used in the present invention.

Similarly, an LUT which the ICC profile (2) 504 shown in FIGS. 5 and 6 has is an LUT 602, and an LUT which the ICC profile (3) 511 has is an LUT 603. An LUT which the ICC profile (4) 513 has is an LUT 604. The LUTs 602 to 604 are shown in FIG. 7. These LUTs are disposed for every signal outputted at an arbitrary interval. When the dRGB_d2 (510) is input to the LCC profile (3) 511, the LCC profile (3) 511 is rewritten so that the output L*a*b*_d2' (514) becomes substantially the same as L*a*b*_s. The profile thus rewritten is the ICC profile (4) 513. For this purpose, a value with the smallest color difference from an arbitrary value "Value_d2" in the L*a*b*_d2 (512) which the LUT 603 has is found from the LUT 602. The value thus found is a Value_d1. The value of the Value_d1 before compression is the Value_s from the relationship with the LUT 601, and therefore, the Value_d2 is replaced by the Value_s. If this is performed for all the elements of the LUT 603, the LUT 604 which associates the L*a*b*_s 503 before compression with dRGB_d2, that is, the ICC profile (4) 513 shown in FIG. 6 is obtained. Accordingly, with the ICC profile (2) 504 in which the relationship between the sRGB and the recording device is defined and the conditions of compression are stored, the color before compression can be reproduced by using the LUT obtained by the above described method. Here, the ICC profile may be stored in a storage device not illustrated.

In the present embodiment, explanation is made by using sRGB as the color space of the basis, and the CIE-L*a*b* as a PCS, but it goes without saying that the corresponding color spaces are not limited to them. Specifically, aRGB may be used instead of sRGB, and the PCS may be a CIE-XYZ space (the space that is defined by the standard-setting organization such as CIE). In any case, the present invention can be applied to any color space in which the values of RGB and the corresponding PCS are fixed. And printed matter of sRGB image that is recorded by the recording device is read by the reader and read dRGB is converted by the ICC profile (4). As a result, previous colors of the sRGB image at the time before the sRGB image had been recorded by the recording device can be restored. And a difference between the calorimetric value (L*a*b*_d2') of L*a*b* which is obtained from the conversion using ICC profile (4) and the previous value (L*a*b*_s) which is obtained before the printed matter 508 is printed becomes smaller than a difference between the colorimetric value (L*a*b_d2') of L*a*b* and dRGB_d2 (or L*a*b_d2).

Further, a plurality of ICC profiles (2) 504, one of which is used in the present embodiment, may be adopted. In this case, in accordance the kind of paper and printing conditions of the original read by the reader 509, the ICC profile (4) 513 can be created from the ICC profile (2) 504. Accordingly, the user can select the ICC profile (2) 504 to be used in accordance with the original to be scanned.

Furthermore, in the present embodiment, the color conversion unit is described by using the ICC profile, but this is not restrictive. Specifically, the color conversion unit may be a profile for performing color matching by further considering the luminous environment by using scRGB that is an extended color space corresponding to Kuanos with a wider color gamut than sRGB. In this case, matching precision is improved more than in the case of using ICC.

All the processing described above is executed by a CPU (central processing unit) not illustrated of the device shown in FIG. 3.

As above, according to the embodiments, when an original is read and displayed on the display, the region which is compressed in printing is extended, and richer color reproduction is made possible. By creating and applying a plurality of color conversion matrixes and ICC profiles of the above described embodiments 1 and 2 in accordance with the kinds of originals, not only an ink-jet original but also a film photo and an offset-printed original can be expressed on the display as if they were imaged by a digital still camera.

In the present invention, there is the case where a plurality of color spaces are adopted. In this case, the color spaces may be called "the first color space" and "the second color space".

While the present invention has been described with reference to exemplary embodiments, it is to be understood that the invention is not limited to the disclosed exemplary embodiments. The scope of the following claims is to accord with the broadest interpretation so as to encompass all such modifications and equivalent structures and functions.

This application claims the benefit of Japanese Patent Application No. 2007-177246, filed Jul. 5, 2007, which is hereby incorporated by reference herein in its entirety.

What is claimed is:

1. A color conversion apparatus, comprising: unit that reads an original in which a whole reproducible color gamut is discretely expressed, and acquires color coordinates of a first color space; color conversion unit that converts the acquired color coordinates of the first color space into a second color space; and unit that reads information compressed from the second color space to the first color space by printing the original, wherein the color conversion unit restores the read color coordinates of the first color space to the second color space by using a profile.

2. The color conversion apparatus according to claim 1, wherein the second color space is a color space of sRGB.

3. The color conversion apparatus according to claim 1, wherein the second color space is Adobe (registered trademark) RGB.

4. The color conversion apparatus according to claim 1, wherein the color conversion unit comprises a plurality of kinds of conversion unit in accordance with kinds of originals.

5. A color conversion apparatus, comprising: unit that reads an original in which a whole reproducible color gamut is discretely expressed, and acquires color coordinates of a first color space; color conversion unit for converting the acquired color coordinates of the first color space into a second color space; unit that records the original, which is expressed in the second color space, in the first color space; and unit that stores a condition of compression of the second color space to the first color space, wherein the color conversion unit restores the read color coordinates of the first color space to the second color space based on the stored condition.

6. A color conversion method, comprising: a step of reading an original in which a whole reproducible color gamut is discretely expressed, and acquiring color coordinates of a first color space; a color conversion step of converting the acquired color coordinates of the first color space into a second color space; and a step of reading information compressed from the second color space to the first color space when the original is printed, wherein in the color conversion step, the read color coordinates of the first color space are restored to the second color space by using a profile.

7. A color conversion method, comprising: a step of reading an original in which a whole reproducible color gamut is discretely expressed, and acquiring color coordinates of a first color space; a color conversion step of converting the acquired color coordinates of the first color space into a second color space; a step of recording the original, which is expressed in the second color space, in the first color space; and a step of storing a condition of compression of the second color space to the first color space, wherein in the color conversion step, the read coordinates of the first color space are restored to the second color space based on the stored condition.

8. A color conversion method, comprising: a step of reading an original on which the device RGB signal is printed by a reader, and acquiring color coordinates of device RGB of the reader, after conversion of sRGB image data into the device RGB of a printer; and a color conversion step of converting the acquired color coordinates of the device RGB of the reader into CIE compliant color coordinates in accordance with the sRGB.

* * * * *